(12) United States Patent
Seidel et al.

(10) Patent No.: US 12,451,531 B2
(45) Date of Patent: Oct. 21, 2025

(54) METHOD FOR DETERMINING A STATE OF A CELL OF A BATTERY

(71) Applicants: VOLKSWAGEN AKTIENGESELLSCHAFT, Wolfsburg (DE); STODIA GMBH, Gifhorn (DE)

(72) Inventors: André Seidel, Gifhorn (DE); Jan-Michael Köhler, Braunschweig (DE); Stephan Rudolph, Bahrdorf (DE); Ilmir Baianov, Schöppenstedt (DE)

(73) Assignees: VOLKSWAGEN AKTIENGESELLSCHAFT, Wolfsburg (DE); STODIA GMBH, Gifhorn (DE)

( * ) Notice: Subject to any disclaimer, the term of this patent is extended or adjusted under 35 U.S.C. 154(b) by 498 days.

(21) Appl. No.: 18/010,659

(22) PCT Filed: Jun. 15, 2021

(86) PCT No.: PCT/EP2021/066043
§ 371 (c)(1),
(2) Date: Jan. 31, 2023

(87) PCT Pub. No.: WO2021/254995
PCT Pub. Date: Dec. 23, 2021

(65) Prior Publication Data
US 2023/0163375 A1    May 25, 2023

(30) Foreign Application Priority Data
Jun. 16, 2020    (DE) .................... 10 2020 115 887.4

(51) Int. Cl.
*H01M 10/48*    (2006.01)

(52) U.S. Cl.
CPC ...... *H01M 10/482* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,170,124 A | 12/1992 | Blair et al. |
| 2012/0019253 A1 | 1/2012 | Ziegler et al. |

(Continued)

FOREIGN PATENT DOCUMENTS

| | | |
|---|---|---|
| DE | 69123822 T2 | 7/1997 |
| DE | 10 2009 000 337 A1 | 7/2010 |

(Continued)

OTHER PUBLICATIONS

Search Report for International Application No. PCT/EP2021/066043, mailed on Oct. 8, 2021.

*Primary Examiner* — Eli S Mekhlin
(74) *Attorney, Agent, or Firm* — PEARL COHEN ZEDEK LATZER BARATZ LLP

(57) ABSTRACT

A method for determining a respective state of each of a plurality of cells of a battery, comprising at least the following steps: a) carrying out a charging operation or a discharging operation on the cells; b) determining a discharge voltage of each of the cells and a charge voltage of each of the cells; c) determining at least one state parameter for each cell, wherein the state parameter is derived from the discharge voltage and the charge voltage, wherein a discharge voltage and a charge voltage of at least one other cell is taken into account for the state parameter.

9 Claims, 5 Drawing Sheets

(56) References Cited

U.S. PATENT DOCUMENTS

| | | |
|---|---|---|
| 2012/0105069 A1 | 5/2012 | Wang et al. |
| 2014/0278169 A1 | 9/2014 | Kim |
| 2015/0160300 A1 | 6/2015 | Ishii et al. |
| 2016/0266210 A1 | 9/2016 | Kang et al. |

FOREIGN PATENT DOCUMENTS

| | | |
|---|---|---|
| DE | 10 2011 117 249 A1 | 5/2012 |
| DE | 10 2014 214 314 A1 | 1/2016 |
| DE | 10 2014 223 278 A1 | 5/2016 |
| EP | 243 9551 A1 | 4/2012 |

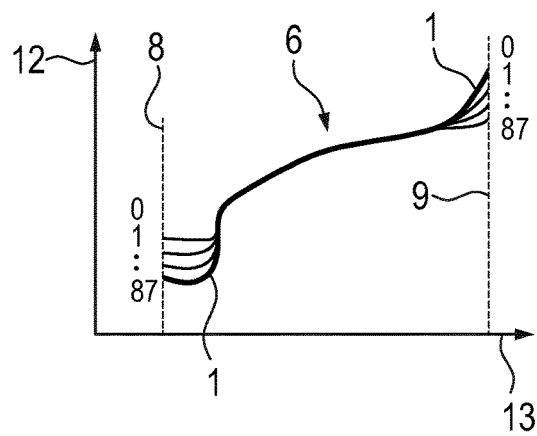
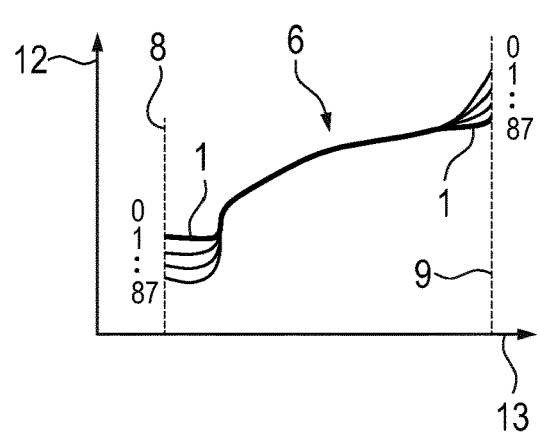
Fig. 3  Fig. 4
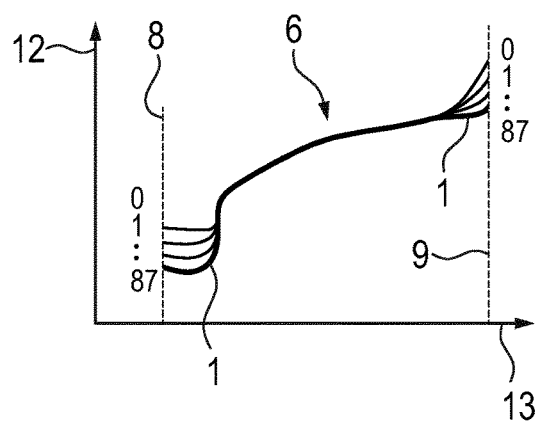
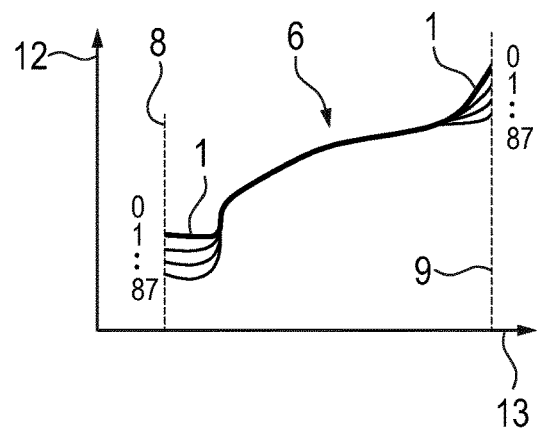
Fig. 5  Fig. 6
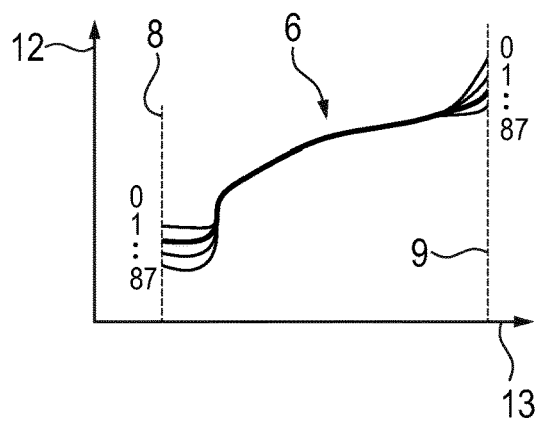
Fig. 7

METHOD FOR DETERMINING A STATE OF A CELL OF A BATTERY

CROSS-REFERENCE TO RELATED APPLICATIONS

This application is a National Phase Application of PCT International Application No. PCT/EP2021/066043, International Filing Date Jun. 15, 2021, claiming priority of German Patent Application No. 10 2020 115 887.4, filed Jun. 16, 2020, which is hereby incorporated by reference.

FIELD OF THE INVENTION

The invention relates to a method for determining the state of a cell in a battery, particularly of a high-voltage battery. In particular, the method is aimed at determining a state of a cell while taking the states of other cells of the same battery into account.

BACKGROUND OF THE INVENTION

Such high-voltage batteries are used particularly in motor vehicles for the purpose of storing electric power for driving traction drives. A battery is normally composed of a plurality of cells, with each cell having a terminal voltage of 1.5 to 4 volts. The cells are at least partially connected in series, whereby a traction voltage of 60 to 1,500 volts of direct current is provided.

In light of current and future legislation, it is necessary to detect the state of the battery or of the cells when a motor vehicle is in operation. In particular, by determining the state of the cells, early failure detection and early service detection can be performed, thereby avoiding failure of a cell or battery during operation and enabling the prompt replacement of the cell or battery.

The known methods for determining the state of a cell or a battery usually only provide snapshots, with the effect that the evolution of the state (e.g., SOH—state of health) of the cell or battery is not detected.

A method for determining a state of health of a battery cell is known from DE 10 2009 000 337 A1. An impedance spectrum of the battery cell is recorded.

A method for monitoring a lithium-ion battery cell is known from DE 10 2011 117 249 A1. There, a load capacity is differentiated according to the corresponding battery cell voltage.

A method for operating a secondary battery is known from DE 10 2014 214 314 A1. The state parameters of individual cells are detected, and an operating strategy is derived from them.

SUMMARY OF THE INVENTION

It is the object of the present invention to at least partially solve the problems described herein with reference to the prior art. In particular, a method for determining a state of a cell of a battery is to be provided. In particular, the method should make it possible to obtain information on the evolution of the state over a service life.

A method with the features according to claim 1 contributes to the achievement of these objects. Advantageous developments are the subject of the dependent claims. The features listed individually in the claims can be combined in a technologically meaningful manner and supplemented by explanatory facts from the description and/or details of the figures, with additional design variants of the invention being indicated.

A method for determining a respective state of a plurality of cells of a battery is proposed. In particular, the method should be able to determine the state of at least one cell of the battery, preferably of every cell of the battery.

The method comprises at least the following steps:
a) carrying out a charging operation or a discharging operation on the cells;
b) determining a discharge voltage of each of the cells and a charge voltage of each of the cells;
c) determining at least one state parameter for each cell, the state parameter being derived from the discharge voltage and the charge voltage, with a discharge voltage and a charge voltage of at least one other cell being taken into account for the state parameter.

The above (non-exhaustive) breakdown of the method steps into a) through c) is primarily intended to serve purposes of distinction and not to impose any order and/or dependency. The frequency of the method steps, e.g., during the setting-up and/or operation of the system, may vary. It is also possible for method steps to overlap temporally at least in part. Method steps b) and c) very especially preferably take place during or immediately after step a). In particular, steps a) to c) are carried out in the order listed.

The charging operation and discharging operation each refer to a charging process in which the cell is exclusively supplied with an electric current (charging operation) or an electric current is exclusively removed from the cell (discharging operation). In particular, each charging operation can be evaluated using the method, regardless of the amount of electrical current supplied or removed.

As part of step b), a discharge voltage and a charge voltage are determined or measured for each of the cells under consideration. The discharge voltage describes the voltage of the cell after the discharging operation. The charge voltage describes the voltage of the cell after the charging operation. In particular, the voltages of the plurality of cells are determined at the same point in time, i.e., all discharge voltages at a common point in time and all charge voltages at another common point in time.

The discharge voltage is particularly the lowest voltage of a charging operation. The charge voltage is particularly the highest voltage of a charging operation.

In particular, a charging operation can be used to carry out the method multiple times. For example, the respective voltage of the cells can be determined at specific points in time during the ongoing charging operation, and the method can be carried out taking these voltages into account.

As part of step c), at least one state parameter is determined for each cell under consideration. This is derived from the discharge voltage and the charge voltage of this cell. However, the corresponding voltages of at least one other cell, but particularly of all other cells under consideration, are also taken into account.

In particular, the state parameter is determined by normalization. The normalization enables the states of the different cells to be compared with one another.

In particular, the at least one state parameter is determined for at least a plurality of charging operations, with an evolution of the state parameters determined in this manner being taken into account.

Since the method can be carried out at any time and for any type of charging operation and independently of the amount of electrical current removed or supplied, a plausibility check of previous results can be easily implemented.

This enables previously determined state parameters to be checked or verified by frequent repetition of the method. In addition, an evolution of the state parameters and thus of the state of the cell can be tracked with high temporal resolution.

In particular, one state parameter is at least one capacity parameter or equilibrium parameter. The capacity parameter describes a ratio of the discharge voltage and the charge voltage of a cell taking the ratio of other cells into account. In particular, the capacity parameter thus describes the difference between the discharge voltage and the charge voltage of a charging operation of a cell. A large difference corresponds to a small capacity of the cell, since a small amount of electric current brings about a large difference in the voltage of the cell. Conversely, a small difference corresponds to a high capacity of the cell.

The equilibrium parameter describes a discharge voltage level and a charge voltage level of a cell compared to the respective voltage levels of other cells. In particular, the equilibrium parameter describes the difference between a first charge voltage level, or value, of a cell compared to the respective first charge voltage level of the other cells and a second discharge voltage level of the cell compared to the respective second discharge voltage level of the other cells.

A negative equilibrium, for example, means that a cell that is most deeply discharged compared to the other cells, i.e., the one having the lowest discharge voltage among all of the cells, is charged the least in a charging operation—i.e., it has the lowest charge voltage among all of the cells.

A positive equilibrium, for example, means that a cell that is least deeply discharged compared to the other cells, i.e., the one having the highest discharge voltage among all of the cells, is charged the most in a charging operation—i.e., it has the highest charge voltage among all of the cells.

A balanced equilibrium, for example, means that a cell that is the third-least discharged compared to the other cells, i.e., the one having the third-lowest discharge voltage among all of the cells, is charged the third-most in a charging operation—i.e., it has the third-highest charge voltage among all of the cells.

In particular, the discharge voltage and charge voltage determined for each cell is normalized in order to determine the state parameters. The following applies to the normalized charge voltage $x_i$ of a cell i:

$$x_i = \frac{U_{xi} - U_{xmin}}{U_{xmax} - U_{xmin}}$$

where the following applies for the normalized discharge voltage $y_i$ of a cell i:

$$y_i = \frac{U_{yi} - U_{ymin}}{U_{ymax} - U_{ymin}} - 1.$$

Here, $U_{xi}$: is the charge voltage of the cell i under consideration,
$U_{xmin}$: is the maximum charge voltage of all of the cells i=1 to n under consideration,
$U_{xmin}$: is the minimum charge voltage of all of the cells i=1 to n under consideration,
$U_{yi}$: is the discharge voltage of the cell i under consideration,
$U_{ymin}$: is the maximum discharge voltage of all of the cells i=1 to n under consideration,
$U_{xmin}$: is the minimum discharge voltage of all of the cells i=1 to n under consideration, The number of cells here is n, where i or n is a natural number, i.e., n=2, 3, 4, . . . .

The normalization for the charge voltage is therefore based on a difference between the maximum charge voltage among all of the cells and the minimum charge voltage among all of the cells in this charging operation.

The normalization for the discharge voltage is therefore based on a difference between the maximum discharge voltage among all of the cells and the minimum discharge voltage among all of the cells in this charging operation.

The normalization enables one cell to be compared with the other cells in the battery.

In particular, the at least one state parameter is a capacity parameter $C_i$ of a cell i, where: $C_i = 2 - (x_i - y_i)$.

In particular, the at least one state parameter is an equilibrium parameter $B_i$ of a cell i, where: $B_i = 1 - |x_i + y_i|$.

In particular, a reciprocal of the state parameter is considered in order to determine the state of a cell. The reciprocal of $C_i$ is particularly $1/C_i$. The reciprocal of $B_i$ is particularly $1/B_i$.

In particular, an intervention limit is defined for each state parameter, and when this is exceeded, a repair status is decided upon for the relevant cell.

In particular, the intervention limit is determined as a function of the state parameters determined for the majority of the cells.

In particular, an arithmetic mean of these state parameters of the cells under consideration is formed for the respective state parameter, with the intervention limit being at least 130%, preferably at least 150%, or even 200% of this mean value, for example.

In particular, the intervention limit for the last charging operation or discharging operation is redetermined. In particular, the arithmetic mean can be recalculated for each charging operation, for example. This enables continuous degradation of the cells over their lifetime to be taken into account in particular.

Particularly, the method can be implemented in a control unit, the control unit being provided at least for diagnosing and optionally also for operating the battery.

The battery can be used in a motor vehicle to store energy, with at least one traction drive of the motor vehicle being supplied with electric power via the battery.

What is proposed in particular is a motor vehicle with a traction drive and the described battery assembly.

A control device or a data processing system is also proposed which is equipped, configured, or programmed to carry out the method described.

Furthermore, the method can also be carried out by a computer or with a processor of a control unit or of a data processing system.

Accordingly, a system for data processing is also proposed which comprises a processor that is adapted/configured in such a way that it carries out the method or a portion of the steps of the proposed method. In particular, the system for data processing for determining the state of a plurality of cells of a battery comprises at least one voltage detector for determining or measuring the voltage (e.g., charge voltage and discharge voltage) and means suitable for carrying out the steps of the method described.

A computer-readable storage medium can be provided that comprises instructions which, when executed by a computer/processor, cause the latter to carry out the method or at least a portion of the steps of the proposed method.

Remarks concerning the method can be applied particularly to the battery assembly, the motor vehicle, and/or the computer-implemented method (i.e., the computer or processor, data processing system, computer-readable storage medium), and vice versa.

Particularly in the claims and in the description that describes them, the indefinite articles ("a" and "an") are to be understood as such and not as quantifiers. Accordingly, terms and components that are introduced therewith are thus to be understood as being present at least singly but particularly also possibly in a plurality.

By way of precaution, it should be noted that the number words used here ("first," "second," . . . ) serve primarily (only) to distinguish a plurality of similar objects, quantities, or processes; that is, they do not prescribe any dependency and/or order of these objects, quantities, or processes relative to one another. Should a dependency and/or order be required, this is explicitly stated herein or it obviously follows for a person skilled in the art when studying the embodiment specifically described. If a component can occur multiple times ("at least one"), the description of one of these components can apply equally to all or a portion of the plurality of these components, but this is not necessarily the case.

BRIEF DESCRIPTION OF THE DRAWINGS

The invention and the technical environment will be explained in greater detail with reference to the enclosed figures. It should be noted that the invention is not intended to be limited by the specified embodiments. In particular, unless explicitly stated otherwise, it is also possible to extract partial aspects of the features explained in the figures and to combine them with other components and insights from the present description. In particular, it should be pointed out that the figures and, in particular, the illustrated proportions are only schematic. In the drawings:

FIG. 3 shows a diagram of a cell with a low capacity;

FIG. 4 shows a diagram of cell with a high capacity;

FIG. 5 shows a diagram of a cell having a negative equilibrium;

FIG. 6 shows a diagram of a cell having a positive equilibrium;

FIG. 7 shows a diagram of a cell having a balanced equilibrium;

DETAILED DESCRIPTION OF THE INVENTION

Figure 1:
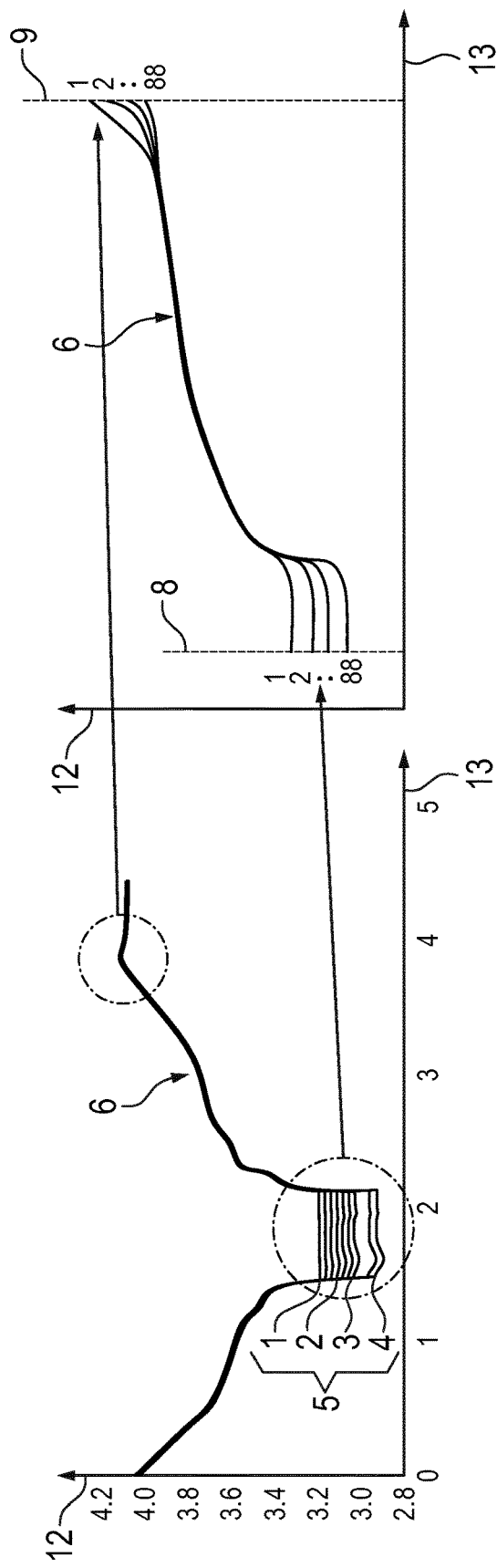
FIG. 1 shows two diagrams illustrating a charging operation of a battery.

FIG. 1 shows two diagrams of a charging operation 6 of a battery 5. The voltage 12 is plotted on the vertical axes of the diagrams. The time 13 is plotted on the horizontal axis of the diagrams. The battery 5 comprises a plurality of cells 1, 2, 3, 4. At the beginning of the charging operation 6, discharge voltages 8 of each of the cells 1, 2, 3, 4, . . . n are measured, where n=88. At the end of the charging operation, the charge voltages 9 of each of the cells 1, 2, 3, 4, . . . n are measured.

Figure 2:
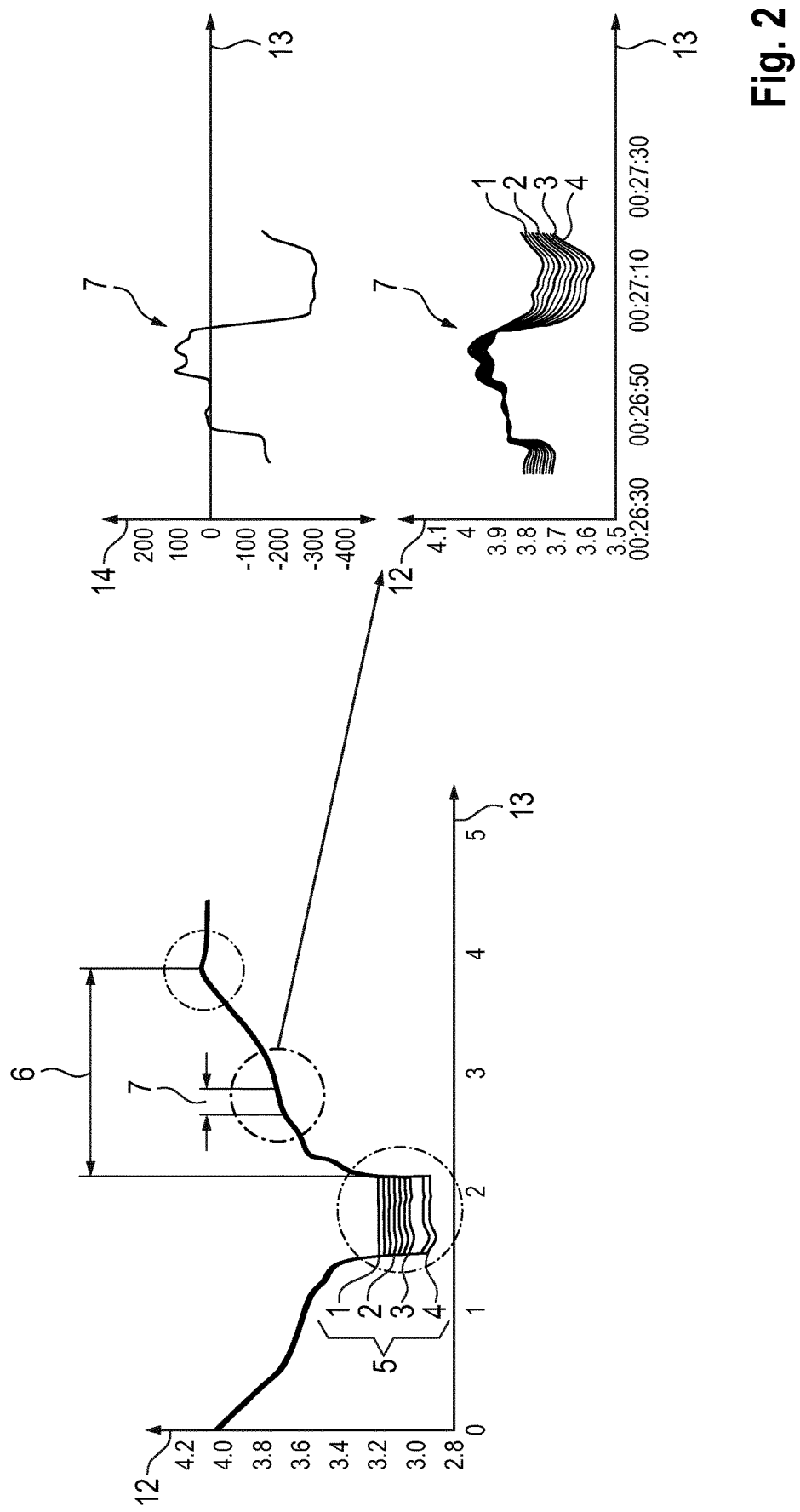
FIG. 2 shows three diagrams illustrating an interim discharging operation.

FIG. 2 shows three diagrams of an interim discharging operation 7. This takes place during the charging operation 6 according to FIG. 1. The voltage 12 is plotted on the vertical axes of the diagrams, and the current 14—here the discharge current—is plotted on the upper right diagram. The time 13 is plotted on the horizontal axis of the diagrams. It can be seen that the cells 1, 2, 3, 4 have different voltage profiles 12 while the battery 5 is being discharged with the current 14. Reference is made to the remarks in relation to FIG. 1.

The following FIGS. 3 to 7 each show profiles for the voltages 12 of individual cells, the battery 5 examined there having a total of 88 cells, here from cell 0 to cell 87. The respective profile of a voltage described below is always explained as an example for a cell which is referred to here as the first cell 1.

FIG. 3 is a diagram showing a cell 1 with a small capacity.
FIG. 4 is a diagram showing a cell 1 with a large capacity.
FIGS. 3 and 4 are described together below.

The voltage 12 is plotted on the vertical axes of the diagrams. The time 13 is plotted on the horizontal axis of the diagrams. The identifiably great difference between the discharge voltage 8 and the charge voltage 9 of the first cell 1 visible in FIG. 3 corresponds to a low capacity of the cell 1, since a small amount of electric current 14 brings about a great difference in the voltage 12 of the cell 1. Conversely, a small difference corresponds to a high capacity of the cell 1. This situation is illustrated in FIG. 4.

FIG. 5 shows a diagram of a cell 1 having a negative equilibrium. FIG. 6 shows a diagram of a cell 1 having a positive equilibrium. FIG. 7 shows a diagram of a cell 1 having a balanced equilibrium. FIGS. 5 to 7 are described together below.

The voltage 12 is plotted on the vertical axes of the diagrams. The time 13 is plotted on the horizontal axes of the diagrams.

A negative equilibrium, which is illustrated in FIG. 5, means that a first cell 1 that is most deeply discharged compared to the other cells 2, 3, 4, i.e., the one having the lowest discharge voltage 8 among all of the cells 1, 2, 3, 4, is charged the least in a charging operation 6—i.e., it has the lowest charge voltage 9 among all of the cells 1, 2, 3, 4.

A positive equilibrium, which is illustrated in FIG. 6, means that a first cell 1 that is least deeply discharged compared to the other cells 2, 3, 4, i.e., the one having the highest discharge voltage 8 among all of the cells 1, 2, 3, 4, is charged the most in a charging operation 6—i.e., it has the highest charge voltage 9 among all of the cells 1, 2, 3, 4.

A balanced equilibrium, which is illustrated in FIG. 7, means that a first cell 1 that is the third-least discharged compared to the other cells 1, 2, 3, 4, i.e., the one having the third-lowest discharge voltage among all of the cells 1, 2, 3, 4, is charged the third-most in a charging operation 6—i.e., it has the third-highest charge voltage 9 among all of the cells 1, 2, 3, 4.

Figure 8:
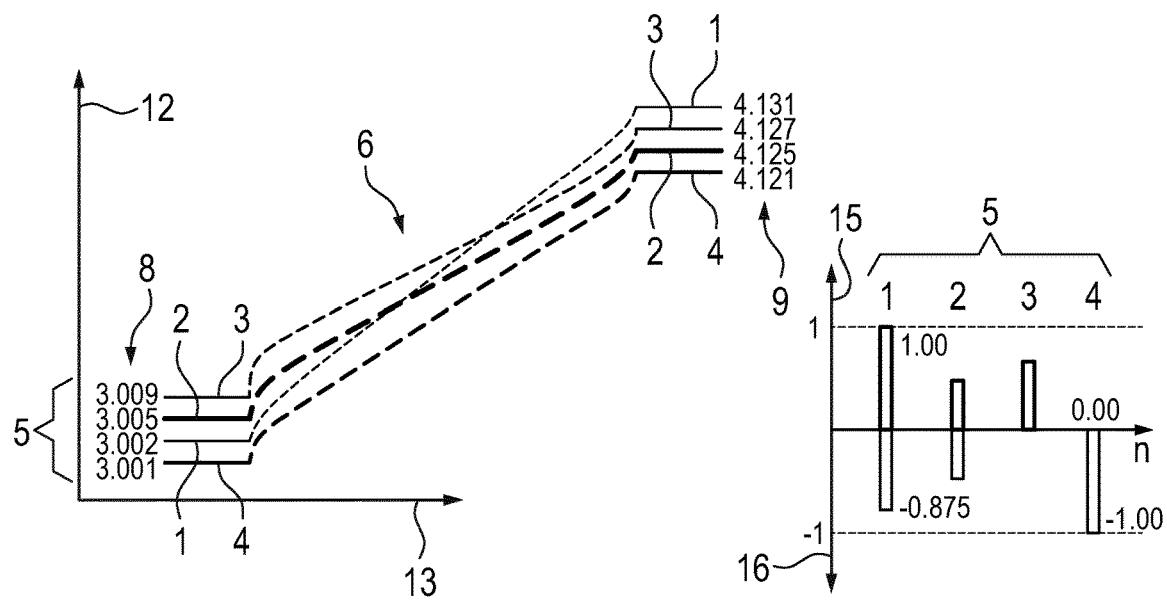
FIG. 8 shows two diagrams of a charging operation of a plurality of cells and the nominalized voltages thereof.

FIG. 8 shows two diagrams illustrating a charging operation 6 of a plurality of cells 1, 2, 3, 4 and the nominalized voltages 15, 16 thereof. In the diagram on the left, the voltage 12 is plotted on the vertical axis. The time 13 is plotted on the horizontal axis. The battery 5 comprises a plurality of cells 1, 2, 3, 4. At the beginning of the charging operation 6, discharge voltages 8 of each of the cells 1, 2, 3, 4 are measured. For example, the first cell 1 has a discharge voltage 8 of 3.002 volts. At the end of the charging operation 6, the charge voltages 9 of each of the cells 1, 2, 3, 4 are measured. Here, the first cell 1 has a charge voltage 9 of 4.131, for example.

In the diagram on the right, the value of the normalized charge voltage 15 $x_i$ is plotted on the vertical axis above the horizontal axis, and the value of the normalized discharge voltage $y_i$ 16 is plotted below the horizontal axis. The cells 1, 2, 3, 4, i.e., n, are plotted on the horizontal axis.

According to $x_i = \dfrac{U_{xi} - U_{xmin}}{U_{xmax} - U_{xmin}}$, the normalized charge voltage 15 of the first cell 1 is 1.0 here, whereas the charge voltage 9 of the first cell 1 under consideration has the value 4.131, the maximum charge voltage 9 among all of the cells 1, 2, 3, 4 under consideration has the value 4.131, and the minimum charge voltage 9 among all of the cells 1, 2, 3, 4 under consideration has the value 4.121.

According to $$y_i = \dfrac{U_{yi} - U_{ymin}}{U_{ymax} - U_{ymin}} - 1,$$

the normalized discharge voltage 16 of the first cell 1 is −0.875 here, whereas the discharge voltage 8 of the first cell 1 under consideration has the value 3.002, the maximum discharge voltage 8 among all of the cells 1, 2, 3, 4 under consideration has the value 3.009, and the minimum discharge voltage 8 among all of the cells 1, 2, 3, 4 under consideration has the value 3.001.

Figure 9:
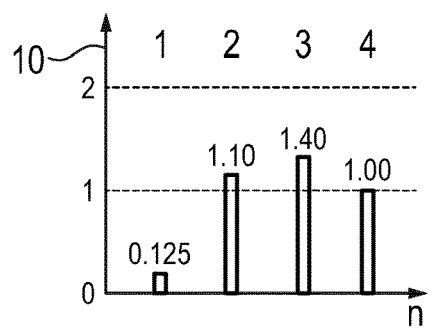
FIG. 9 shows a diagram of the capacity parameters of the plurality of cells of FIG. 8.

FIG. 9 shows a diagram of the capacity parameters 10 of the plurality of cells 1, 2, 3, 4 according to FIG. 8. The capacity parameter 10 is plotted on the vertical axis. The cells 1, 2, 3, 4, i.e., n, are plotted on the horizontal axis.

The following applies to the capacity parameter $C_i$ 10 of a cell i: $C_i = 2-(x_i-y_i)$. The capacity parameter 10 for the first cell 1 is thus 0.125 here.

Figure 10:
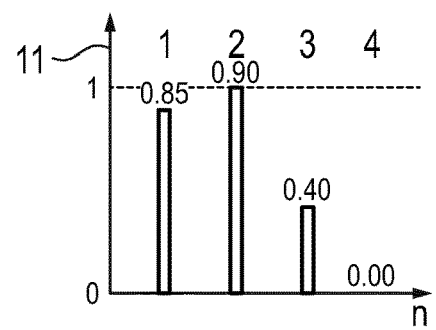
FIG. 10 shows a diagram of the equilibrium parameters of the plurality of cells of FIG. 8.

FIG. 10 shows a diagram of the equilibrium parameters 11 of the plurality of cells 1, 2, 3, 4 according to FIG. 8. The equilibrium parameter 11 is plotted on the vertical axis. The cells 1, 2, 3, 4, i.e., n, are plotted on the horizontal axis.

The following applies to the equilibrium parameter $B_i$ 11 of a cell i: $B_i = 1 - |x_i + y_i|$. The equilibrium parameter 11 for the first cell 1 is thus 0.85 here.

Figure 11:
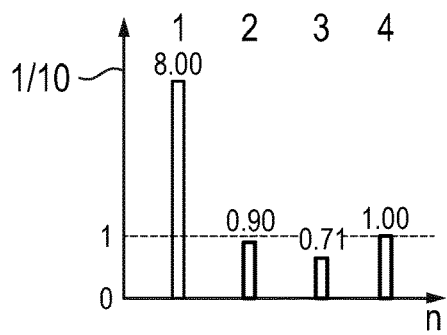
FIG. 11 shows a diagram of the reciprocals of the capacity parameters according to FIG. 9.

FIG. 11 shows a diagram of the reciprocals of the capacity parameters 10 according to FIG. 9. The reciprocal of the capacity parameter 10 is plotted on the vertical axis. The cells 1, 2, 3, 4, i.e., n, are plotted on the horizontal axis. The reciprocal of the capacity parameter 10 for the first cell 1 is thus 8.0 here.

Figure 12:
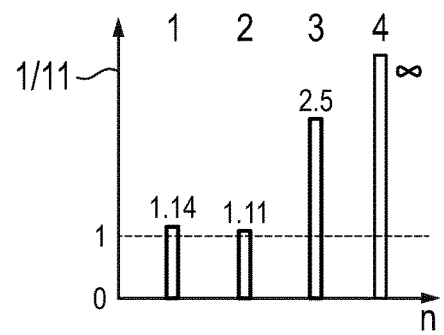
FIG. 12 shows a diagram of the reciprocals of the equilibrium parameters according to FIG. 10.

FIG. 12 shows a diagram of the reciprocals of the equilibrium parameters 11 according to FIG. 10. The reciprocal of the equilibrium parameter 11 is plotted on the vertical axis. The cells 1, 2, 3, 4, i.e., n, are plotted on the horizontal axis. The reciprocal of the equilibrium parameter 11 for the first cell 1 is thus 1.14 here.

Figure 13:
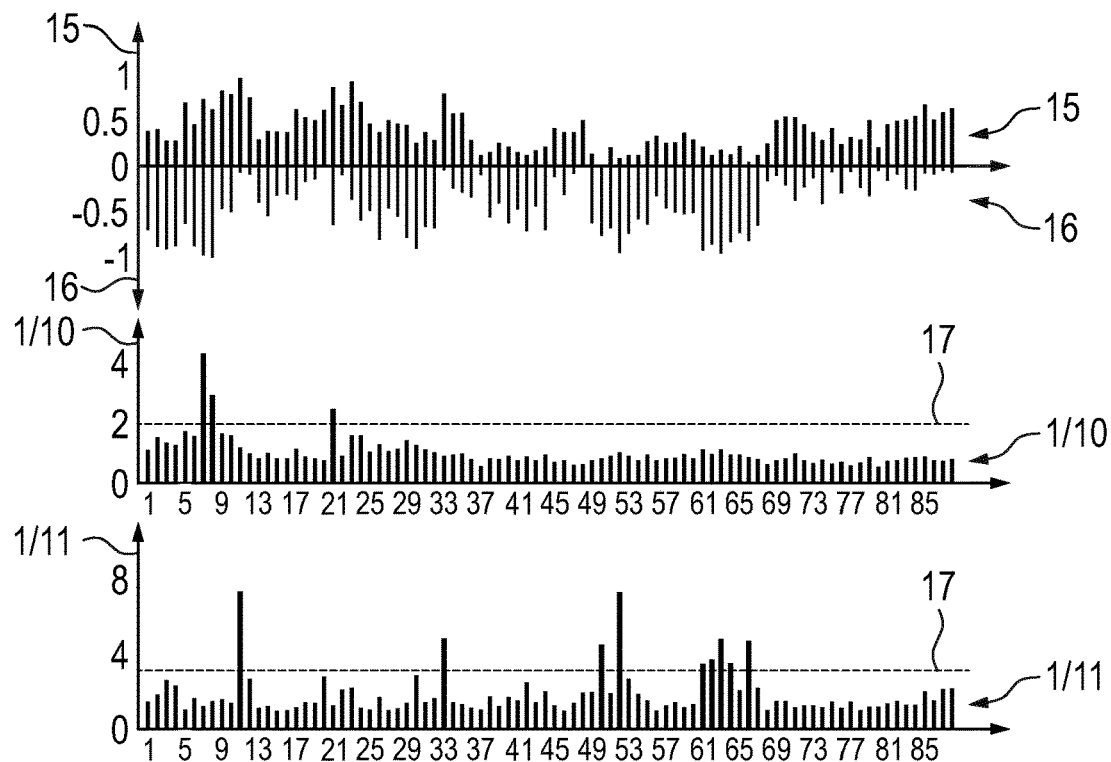
FIG. 13 shows three diagrams of the normalized voltages, the reciprocals of the capacity parameters, and the reciprocals of the equilibrium parameters of all of the cells for a charging operation.

FIG. 13 shows three diagrams of the normalized voltages 15, 16, the reciprocals of the capacity parameters 10, and the reciprocals of the equilibrium parameters 11 for all of the cells 1, 2, 3, 4, . . . n, where n=88, for a charging operation 6. In the uppermost diagram, the values of the normalized charge voltage 15 $x_i$ are plotted on the vertical axis above the horizontal axis, and the values of the normalized discharge voltage $y_i$ 16 are plotted below the horizontal axis.

In the center diagram, the reciprocals of the capacity parameter 10 are plotted on the vertical axis.

The intervention limit 17 for the reciprocal of the capacity parameter 10 is defined as 2.0.

In the lower diagram, the reciprocals of the equilibrium parameter 11 are plotted on the vertical axis.

The intervention limit 17 for the reciprocal of the equilibrium parameter 11 is defined as 3.0.

The cells that exceed the intervention limit 17 defined for the respective parameter (here the 7th, 8th, and 21st cell in the middle diagram as well as the 11th, 33rd, 50th, 52nd, 61st to 64th and 66th cell in the bottom diagram) can be identified. If these cells also exhibit corresponding abnormalities in the further course of the method, or if further deterioration occurs, these cells can be replaced in a targeted manner as necessary. A service date can be set according to the trend of the change in the detected state parameters, so that a failure of the cell during operation is avoided, but an early replacement of the cell can also be prevented.

Figure 14:
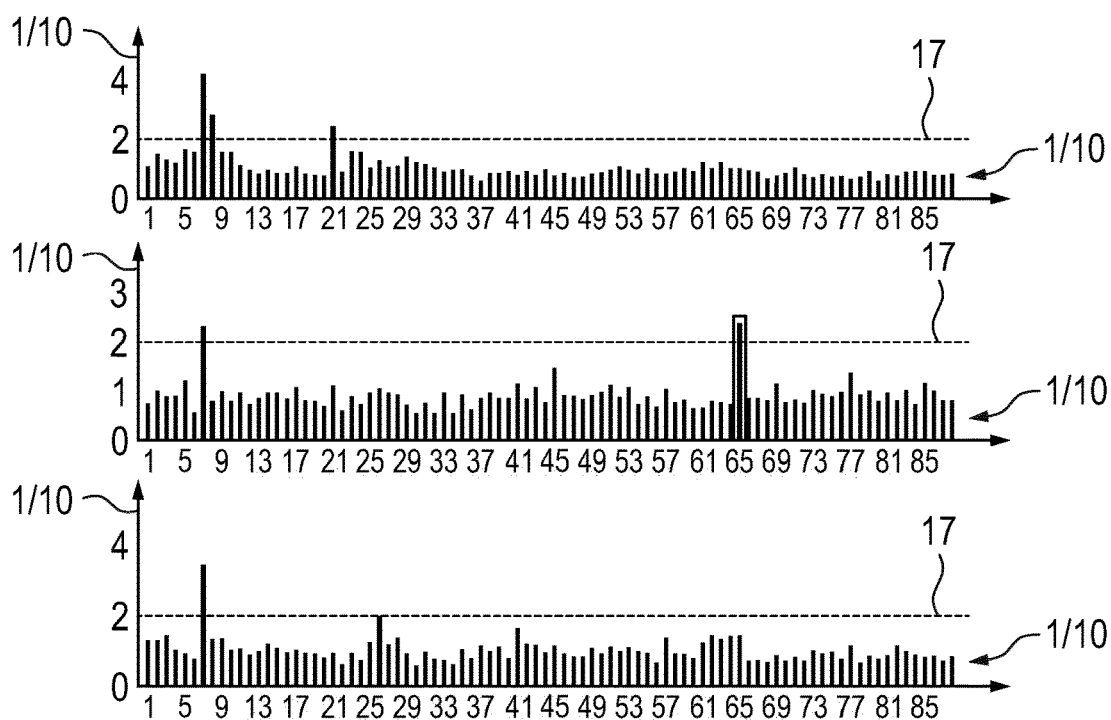
FIG. 14 shows three graphs of the reciprocals of the capacity parameters of all of the cells for three different charges.

FIG. 14 shows three diagrams of the reciprocals of the capacity parameters 10 among all of the cells 1, 2, 3, 4, . . . n, where n=88, for three different charging operations 6; see date information at the top right of each diagram, i.e., September 7, September 10, and September 11 of the same year.

In the diagrams, the reciprocals of the capacity parameter 10 are plotted on the vertical axis. The cells 1, 2, 3, 4, . . . n, where n=88, are plotted on the horizontal axis.

Cells have been identified here as possibly defective: in the top diagram, the 7th, 8th, and 21st cell; in the middle diagram, the 7th and the 65th cell; and in the bottom diagram, the 7th and the 26th cell.

It can be seen that the repeated measurements can also be used to carry out plausibility checks. Here, it can be seen that only the 7th cell is likely actually defective.

LIST OF REFERENCE SYMBOLS 1 first cell
2 second cell
3 third cell
4 fourth cell
5 battery
6 charging operation
7 discharging operation
8 discharge voltage
9 charge voltage
10 capacity parameter
11 equilibrium parameter
12 voltage
13 time
14 current
15 normalized charge voltage $x_i$
16 normalized discharge voltage $y_i$
17 intervention limit

The invention claimed is:

1. A method for determining a respective state of each of a plurality of cells of a battery, comprising at least the following steps:
   a) carrying out a charging operation or a discharging operation on the plurality of cells;
   b) determining a discharge voltage of each of the plurality of cells and a charge voltage of each of the plurality of cells;
   c) determining at least one state parameter for each of the plurality of cells,
   wherein the state parameter is derived from the discharge voltage and the charge voltage,
   wherein a discharge and a charge voltage of at least one other cell is taken into account for the state parameter,
   wherein one state parameter is at least one capacity parameter or equilibrium parameter,
   wherein the capacity parameter describes a ratio of the discharge voltage and the charge voltage of a cell taking ratios of other cells into account, and
   wherein the equilibrium parameter describes a discharge voltage level and a charge voltage level of a cell compared to respective voltage levels of other cells.

2. The method as set forth in claim 1, wherein the at least one state parameter is determined for at least a plurality of charging operations or discharging operations, and
   wherein an evolution of the state parameters determined in this manner is taken into account.

3. The method as set forth in claim 1,
   wherein the discharge voltage and charge voltage determined for each cell is normalized in order to determine the at least one state parameter,
   where the following applies for the normalized charge voltage $x_i$ of a cell i:

$$x_i = \frac{U_{xi} - U_{xmin}}{U_{xmax} - U_{xmin}},$$

where the following applies for the normalized discharge voltage $y_i$ of a cell i:

$$y_i = \frac{U_{yi} - U_{ymin}}{U_{ymax} - U_{ymin}} - 1,$$

and
   where:
   $U_{xi}$: is the charge voltage of the cell i under consideration,
   $U_{xmax}$: is the maximum charge voltage among all of the cells i=1 to n under consideration,
   $U_{xmin}$: is the minimum charge voltage among all of the cells i=1 to n under consideration,
   $U_{yi}$: is the discharge voltage of the cell i under consideration,
   $U_{ymin}$: is the maximum discharge voltage of all of the cells i=1 to n under consideration, and
   $U_{xmin}$: is the minimum discharge voltage among all of the cells i=1 to n under consideration.

4. The method as set forth in claim 3,
   wherein the at least one state parameter is an equilibrium parameter $B_i$ of a cell i, and
   where the following applies: $B_i = 1 - |x_i + y_i|$.

5. The method as set forth in claim 3,
   wherein the at least one state parameter is a capacity parameter $C_i$ of a cell i, and
   where the following applies: $C_i = 2 - (x_i - y_i)$.

6. The method as set forth in claim 5, wherein a reciprocal of the state parameter is considered in order to determine the state of a cell.

7. The method as set forth in claim 6, wherein an intervention limit is defined for each state parameter, and when this is exceeded, a repair status is decided upon for the relevant cell.

8. The method as set forth in claim 7, wherein the intervention limit is determined as a function of the at least one state parameter determined for the plurality of cells.

9. The method as set forth in claim 8, wherein the intervention limit is newly determined for the last charging operation or discharging operation.

* * * * *